US012321630B2

(12) United States Patent
Jang et al.

(10) Patent No.: US 12,321,630 B2
(45) Date of Patent: Jun. 3, 2025

(54) STORAGE DEVICE INCLUDING A CONTROLLER CONFIGURED TO DETERMINE IF USER DATA IS COLD DATA BASED ON A RECLAIM COUNT

(71) Applicant: SAMSUNG ELECTRONICS CO., LTD., Suwon-si (KR)

(72) Inventors: Seung Ryong Jang, Gyeonggi-do (KR); Chan Ha Kim, Hwaseong-si (KR); Gyeong Min Nam, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 17/731,628

(22) Filed: Apr. 28, 2022

(65) Prior Publication Data

US 2023/0114199 A1   Apr. 13, 2023

(30) Foreign Application Priority Data

Oct. 8, 2021   (KR) .................. 10-2021-0133845

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| 10,014,060 B2 | 7/2018 | Tuers et al. |
| 10,372,342 B2 | 8/2019 | Dusija et al. |
| 10,402,102 B2 | 9/2019 | Oh et al. |

(Continued)

FOREIGN PATENT DOCUMENTS

| KR | 10-1548222 | 8/2015 |
| KR | 10-2113212 | 5/2020 |

(Continued)

OTHER PUBLICATIONS

Micheloni, R. and Marelli, A. and Eshghi, K., Inside Solid State Drives (SSDs), 2018, Springer Nature Singapore, second edition, 275-285 (Year: 2018).*

(Continued)

*Primary Examiner* — Eric Cardwell
(74) *Attorney, Agent, or Firm* — MORGAN, LEWIS & BOCKIUS LLP

(57) ABSTRACT

A storage device including: a nonvolatile memory which includes a first memory block configured to store a first user data; and a controller configured to perform a patrol read on the first user data, wherein the controller is configured to increase a reclaim count for the first user data, when the first user data requires a reclaim, the controller is configured to determine that the first user data is a cold data, when the reclaim count for the first user data is greater than a reclaim threshold value, the controller is configured to perform a first reclaim on the first user data when the first user data is determined to be the cold data, and the nonvolatile memory is configured to store the first user data in a second memory block different from the first memory block in response to the first reclaim.

14 Claims, 17 Drawing Sheets

(56) References Cited

U.S. PATENT DOCUMENTS

| | | |
|---|---|---|
| 11,023,132 B2 | 6/2021 | Sunata et al. |
| 2014/0101372 A1* | 4/2014 | Jung .................. G06F 11/1068 |
| | | 711/103 |
| 2018/0181346 A1* | 6/2018 | Kim ........................ G06F 3/064 |
| 2020/0073558 A1* | 3/2020 | Kim ...................... G06F 3/0679 |
| 2020/0210309 A1 | 7/2020 | Jung |
| 2020/0301770 A1* | 9/2020 | Masakawa ............ G06F 11/076 |
| 2021/0103405 A1* | 4/2021 | Jang ...................... G06F 3/0673 |
| 2022/0147252 A1* | 5/2022 | Liu ........................ G06F 9/4401 |
| 2022/0171713 A1* | 6/2022 | Malshe ............... G06F 12/0246 |
| 2022/0375531 A1* | 11/2022 | Ock ................... G11C 16/3418 |

FOREIGN PATENT DOCUMENTS

| | | |
|---|---|---|
| KR | 10-2020-0078138 | 7/2020 |
| KR | 10-2021-0003625 | 1/2021 |

OTHER PUBLICATIONS

Keonsoo H, Jaeyong J., and Jihong K, "An Intergrated Approach for Managing Read Distrubs in High-Density NAND Flash Memory ", Jul. 2016, IEEE transactions on computer-aided design of integrated circuits and systems, vol. 35, No. 7, (Year: 2016).*

\* cited by examiner

10

STORAGE DEVICE INCLUDING A CONTROLLER CONFIGURED TO DETERMINE IF USER DATA IS COLD DATA BASED ON A RECLAIM COUNT

CROSS-REFERENCE TO RELATED APPLICATION

This application claims priority under 35 U.S.C. § 119 to Korean Patent Application No. 10-2021-0133845 filed on Oct. 8, 2021 in the Korean Intellectual Property Office, the disclosure of which is incorporated by reference herein in its entirety.

1. Technical Field

The present disclosure relates to a storage device.

2. Description of the Related Art

Semiconductor memory devices may include volatile memory devices and nonvolatile memory devices. The volatile memory devices have high read and write speeds, but only maintain their data when powered off. On the other hand, since the nonvolatile memory devices retain their data when powered off, the nonvolatile memory devices are used to store data that must be retained, in the absence of power.

For example, the volatile memory devices may include a static random access memory (RAM) (SRAM), a dynamic RAM (DRAM), a synchronous DRAM (SDRAM), and the like. For example, the nonvolatile memory devices may include a read only memory (ROM), a programmable ROM (PROM), an electrically programmable ROM (EPROM), an electrically erasable and programmable ROM (EEPROM), a flash memory, a phase change RAM (PRAM), a magnetic RAM (MRAM), a resistive RAM (RRAM), a ferroelectric RAM (FRAM), and the like. The flash memory may be a NOR type flash memory or a NAND type flash memory.

Referring to Korean publication patent No. 10-2021-0003625, a central processing unit may divide data stored in a non-superblock into hot data and cold data and copy the hot data to a superblock when a read reclaim is performed. Here, the hot data may be data having a large number of read times, and the cold data may be data having a small number of read times. In other words, according to Korean publication patent No. 10-2021-0003625, the storage device classifies the data into the cold data according to the number of read times. This method of classifying the cold data of the storage device may be a problem.

SUMMARY

Embodiments of the present disclosure provide a storage device having increased performance and reliability.

According to an embodiment of the present disclosure, there is provided a storage device including: a nonvolatile memory which includes a first memory block configured to store a first user data; and a controller configured to perform a patrol read on the first user data, wherein the controller is configured to increase a reclaim count for the first user data, when the first user data requires a reclaim, the controller is configured to determine that the first user data is a cold data, when the reclaim count for the first user data is greater than a reclaim threshold value, the controller is configured to perform a first reclaim on the first user data when the first user data is determined to be the cold data, and the nonvolatile memory is configured to store the first user data in a second memory block different from the first memory block in response to the first reclaim.

According to an embodiment of the present disclosure, there is provided a storage device including: a nonvolatile memory; and a controller configured to receive a first user data, a logical block address and a write command from an external device, configured to generate a first matching table of a first address that matches with the logical block address, and configured to output the first address and the first user data to the nonvolatile memory, wherein the nonvolatile memory is configured to store the first user data on the basis of the first address, the controller is configured to increase a reclaim count for the first user data, is configured to perform a reclaim on the first user data, and is configured to generate a second matching table on a second address that matches with the logical block address, and the second address is different from the first address.

According to an embodiment of the present disclosure, there is provided a storage device including: a first nonvolatile memory configured to store a first user data; a second nonvolatile memory different from the first nonvolatile memory; and a controller configured to perform a patrol read on the first user data, wherein the controller is configured to increase a reclaim count for the first user data, when the first user data requires a reclaim, the controller is configured to provide the first user data to the second nonvolatile memory, when the reclaim count for the first user data is greater than a reclaim threshold value, and the second nonvolatile memory is configured to store the first user data.

BRIEF DESCRIPTION OF THE DRAWINGS

The above and/or other features of the present disclosure will become more apparent from the following description of the embodiments, taken in conjunction with the accompanying drawings in which.

DETAILED DESCRIPTION OF THE EMBODIMENTS

Hereinafter, embodiments of the present disclosure will be described referring to the accompanying drawings.

Figure 1:
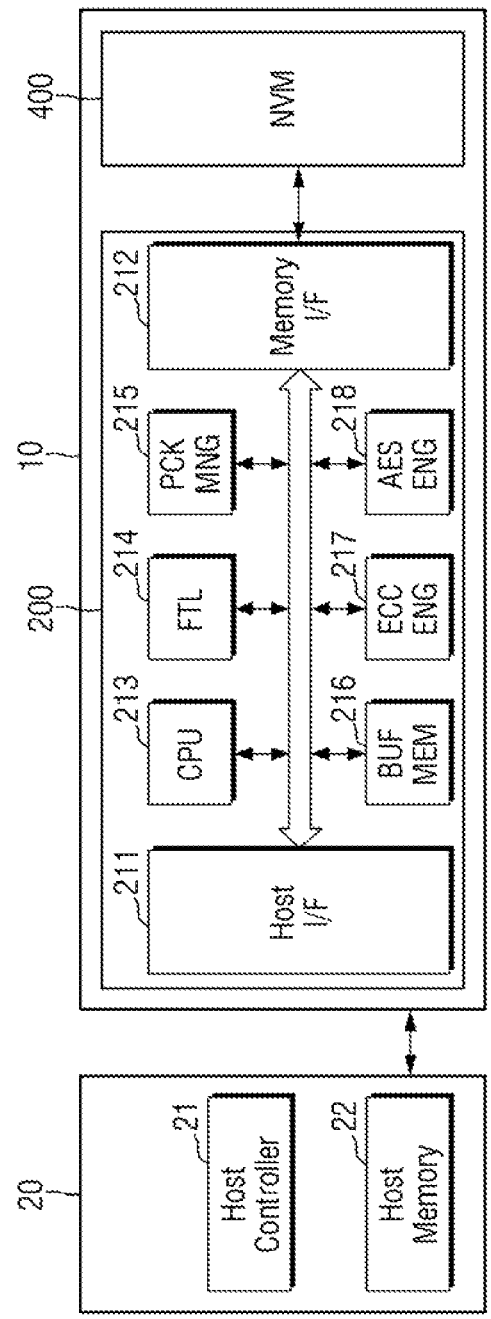
FIG. 1 is a block diagram of a memory system according to some embodiments of the present disclosure.

FIG. 1 is a block diagram of a memory system according to some embodiments of the present disclosure.

Referring to FIG. 1, a memory system 1 may include a host device 20 and a storage device 10. The host device 20 may include a host controller 21 and a host memory 22. The host controller 21 may control the overall operation of the host device 20. The host memory 22 may temporarily store data transmitted from the outside of the host device 20, data to be transmitted to the storage device 10, or data to be transmitted from the storage device 10. The host device 20 may be an application processor (AP). However, the embodiments of the present disclosure are not limited thereto.

The storage device 10 may include a storage controller 200 and a nonvolatile memory 400.

The storage device 10 may include a storage medium for storing data in response to a request from the host device 20. As an example, the storage device 10 may include at least one of a Solid State Drive (SSD), an embedded memory, and a detachable external memory. When the storage device 10 is the SSD, the storage device 10 may be, for example, a device that complies with a non-volatility memory express (NVMe) standard. When the storage device 10 is an embedded memory or an external memory, the storage device 10 may be a device that complies with a universal flash storage (UFS) or an embedded multi-media card (eMMC) standard. The storage device 10 and the host device 20 may each generate and transmit packets according to the adopted standard protocol.

When the nonvolatile memory 400 of the storage device 10 includes a flash memory, the flash memory may include a two-dimensional (2D) NAND memory array or a three-dimensional (3D) (or vertical) NAND (VNAND) memory array. As another example, the storage device 10 may include different types of nonvolatile memories. For example, the storage device 10 may include a Magnetic Random Access Memory (RAM) (MRAM), a spin-transfer torque MRAM, a conductive bridging RAM (CBRAM), a FeRAM (Ferroelectric RAM), a PRAM (Phase RAM), a resistive memory (Resistive RAM), and various other types of memories.

The storage controller 200 may include a host interface 211, a memory interface 212, and a central processing unit (CPU) 213. Further, the storage controller 200 may further include a flash translation layer (FTL) 214, a packet manager 215, a buffer memory 216, an error correction code (ECC) engine 217, and an advanced encryption standard (AES) engine 218. The storage controller 200 may further include a working memory into which the flash translation layer 214 is loaded, and when the CPU 213 executes the flash translation layer 214, data write and read operations of the nonvolatile memory 400 may be controlled.

The host interface 211 may transmit and receive packets to and from the host device 20. The packets transmitted from the host device 20 to the host interface 211 may include a command, data to be written in the nonvolatile memory 400, or the like. The packets to be transmitted from the host interface 211 to the host device 20 may include a response to the command, data that is read from the nonvolatile memory 400 or the like. The memory interface 212 may transmit the data to be written in the nonvolatile memory 400 to the nonvolatile memory 400 or receive the data that is read from the nonvolatile memory 400. Such a memory interface 212 may be implemented to comply with standard protocols such as Toggle or Open NAND Flash Interface (ONFI).

The flash translation layer 214 may perform various functions such as address mapping, wear-leveling, and garbage collection. The address mapping is an operation of changing a logical address received from the host device 20 into a physical address which is used for actually storing the data in the nonvolatile memory 400. For example, the storage controller 200 may generate a matching table including a physical block address corresponding to a logical block address. The wear-leveling is a technique for ensuring that blocks in the nonvolatile memory 400 are uniformly used to prevent excessive deterioration of a particular block, and may be implemented, for example, through a firmware technique for balancing erasure counts of physical blocks. The garbage collection is a technique for ensuring an available capacity in the nonvolatile memory 400 through a method of copying valid data of a block to a new block and then erasing the existing block. In some embodiments of the present disclosure, the storage controller 200 may perform functions such as address mapping, wear-leveling, and garbage collection, by referring to metadata stored in the nonvolatile memory 400.

The packet manager 215 may generate a packet according to the protocol of the interface used by the host device 20, or may parse various types of information from the packet received from the host device 20.

The buffer memory 216 may temporarily store the data to be written in the nonvolatile memory 400 or the data to be read from the nonvolatile memory 400. The buffer memory 216 may be provided inside the storage controller 200, but may be placed outside the storage controller 200.

The ECC engine 217 may perform error detection and correction functions on the read data that is read from the nonvolatile memory 400. For example, the ECC engine 217 may generate parity bits for the write data to be written to the nonvolatile memory 400, and the parity bits thus generated may be stored in the nonvolatile memory 400 together with the write data. When reading the data from the nonvolatile memory 400, the ECC engine 217 may correct an error of the read data, using the parity bits that are read from the nonvolatile memory 400, together with the read data, and output the read data with a corrected error.

The AES engine 218 may perform at least one of encryption and decryption operations of the data which is input to the storage controller 200, using a symmetric-key algorithm.

Figure 2:
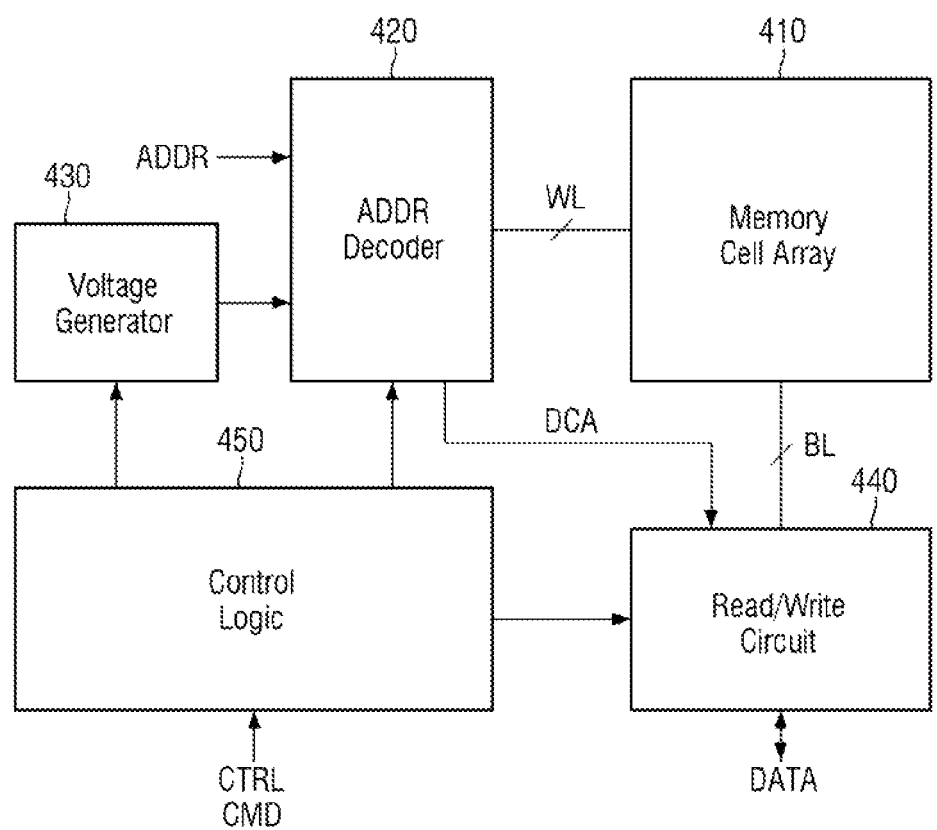
FIG. 2 is a block diagram of a nonvolatile memory of FIG. 1.

FIG. 2 is a block diagram of the nonvolatile memory of FIG. 1.

Referring to FIG. 2, the nonvolatile memory 400 may include a memory cell array 410, an address decoder 420, a voltage generator 430, a read/write circuit 440, a control logic circuit 450, and the like.

The memory cell array 410 may be connected to the address decoder 420 through word lines WL. The memory cell array 410 may be connected to the read/write circuit 440 through bit lines BL. The memory cell array 410 may include a plurality of memory cells. For example, the memory cells arranged in a row direction may be connected to the word lines WL. For example, the memory cells arranged in a column direction may be connected to one of the bit lines BL.

The address decoder 420 may be connected to the memory cell array 410 through the word lines WL. The address decoder 420 may operate in response to the control of the control logic circuit 450. The address decoder 420 may be provided with an address ADDR from the storage controller 200. The address decoder 420 may be provided with a voltage necessary for an operation such as a program or a read from the voltage generator 430.

The address decoder 420 may decode a row address in the received address ADDR. The address decoder 420 may select the word line WL, using the decoded row address. A decoded column address DCA may be provided to the read/write circuit 440. For example, the address decoder 420 may include a row decoder, a column decoder, an address buffer, and the like.

The voltage generator 430 may generate the voltage required for an access operation according to the control of the control logic circuit 450. For example, the voltage generator 430 may generate a program voltage and a program verification voltage required to perform the program operation. For example, the voltage generator 430 may generate read voltages required to perform the read operation, and may generate an erase voltage, an erase verification voltage, and the like required to perform the erase operation. For example, the voltage generator 430 may generate a monitoring voltage for monitoring the data stored in the memory cell array 410. Further, the voltage generator 430 may provide the voltage required to perform each operation to the address decoder 420.

The read/write circuit 440 may be connected to the memory cell array 410 through the bit lines BL. The read/write circuit 440 may send and receive data DATA to and from the storage controller 200. The read/write circuit 440 may operate in response to the control of the control logic circuit 450. The read/write circuit 440 may be provided with the decoded column address DCA from the address decoder 420. The read/write circuit 440 may select at least one of the bit lines BL, using the decoded column address DCA.

For example, the read/write circuit 440 may program the received data DATA in the memory cell array 410. The read/write circuit 440 may read data from the memory cell array 410 and provide the read data to the outside (for example, the storage controller 200). For example, the read/write circuit 440 may include a configuration such as a sense amplifier, a write driver, a column selection circuit, and a page buffer. In other words, the read/write circuit 440 may buffer the data DATA received from the storage controller 200 in the page buffer, and program the buffered data DATA in the memory cell array 410.

The control logic circuit 450 may be connected to the address decoder 420, the voltage generator 430, and the read/write circuit 440. The control logic circuit 450 may control the operation of the nonvolatile memory 400. The control logic circuit 450 may operate in response to a control signal CRTL and a command CMD (e.g., a write command, a read command, etc.) provided from the storage controller 200.

Figure 3:
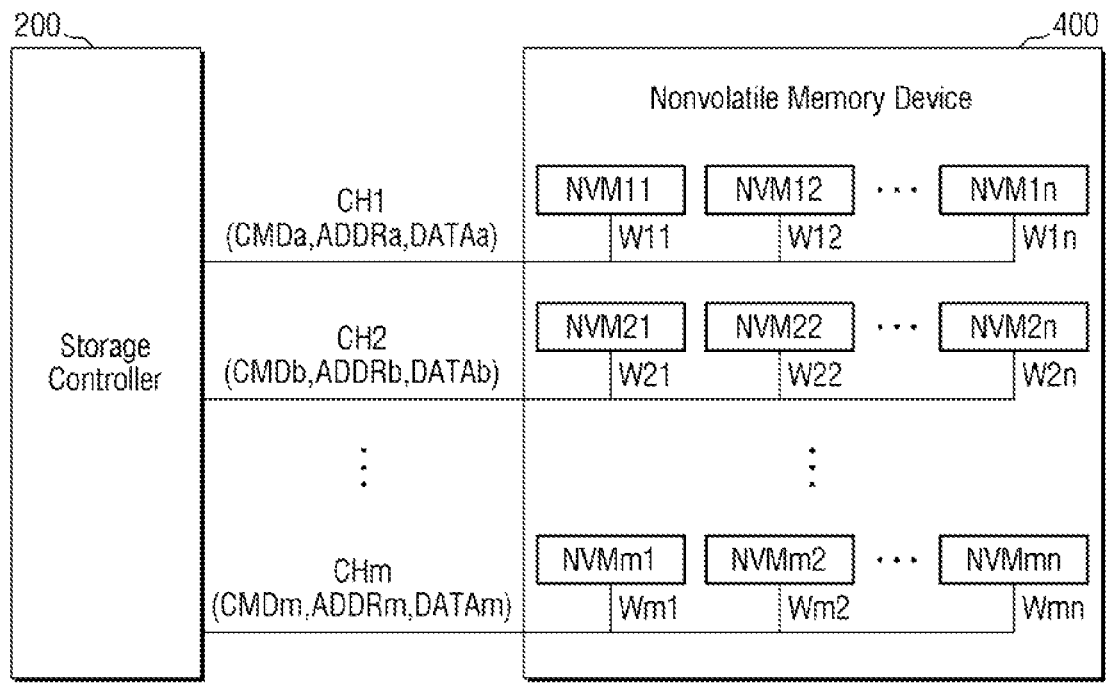
FIG. 3 is a block diagram of a storage controller and the nonvolatile memory of FIG. 1.

FIG. 3 is a block diagram of the storage controller and the nonvolatile memory of FIG. 1.

Referring to FIG. 3, the storage device 10 may include the storage controller 200 and the nonvolatile memory 400. The storage device 10 may support a plurality of channels CH1 to CHm, and the storage controller 200 and the nonvolatile memory 400 may be connected through the plurality of channels CH1 to CHm. For example, the storage device 10 may be implemented as a storage device such as a Solid State Drive (SSD).

The nonvolatile memory 400 may include a plurality of nonvolatile memory devices NVM11 to NVMmn. Each of the nonvolatile memory devices NVM11 to NVMmn may be connected to one of the plurality of channels CH1 to CHm through a corresponding way. For example, nonvolatile memory devices NVM11 to NVM1n are connected to a first channel CH1 through ways W11 to W1$n$, nonvolatile memory devices NVM21 to NVM2$n$ may be connected to a second channel CH2 through ways W21 to W2$n$ and nonvolatile memory devices NVMm1 to NVMmn may be connected to an m-th channel CHm through ways Wm1 to Wmn. In an embodiment of the present disclosure, each of the nonvolatile memory devices NVM11 to NVMmn may be implemented in an arbitrary memory unit that may operate according to individual instructions from the storage controller 200. For example, although each of the nonvolatile memory devices NVM11 to NVMmn may be implemented as a chip or a die, the present disclosure is not limited thereto.

The storage controller 200 may transmit and receive signals to and from the nonvolatile memory 400 through the plurality of channels CH1 to CHm. For example, the storage controller 200 may transmit commands CMDa to CMDM, addresses ADDRa to ADDRm, and data DATAa to DATAm to the nonvolatile memory 400 through the channels CH1 to CHm, or may receive the data DATAa to DATAm from the nonvolatile memory 400.

The storage controller 200 may select one of the nonvolatile memory devices connected to a corresponding channel, and may transmit and receive signals to and from the selected nonvolatile memory device. For example, the storage controller 200 may select the nonvolatile memory device NVM11 among the nonvolatile memory devices NVM11 to NVM1$n$ connected to the first channel CH1. The storage controller 200 may transmit the command CMDa, address ADDRa, and data DATAa to the selected nonvolatile memory device NVM11 through the first channel CH1, or may receive the data DATAa from the selected nonvolatile memory device NVM11 through the first channel CH1.

The storage controller 200 may transmit and receive signals in parallel to and from the nonvolatile memory 400 through different channels from each other. For example, the storage controller 200 may transmit a command CMDb to the nonvolatile memory 400 through the second channel CH2, while transmitting the command CMDa to the nonvolatile memory 400 through the first channel CH1. For example, the storage controller 200 may receive data DATAb from the nonvolatile memory 400 through the second channel CH2, while receiving the data DATAa from the nonvolatile memory 400 through the first channel CH1.

The storage controller 200 may control the overall operation of the nonvolatile memory 400. The storage controller 200 may transmit a signal to each of the channels CH1 to CHm to control each of the nonvolatile memory devices NVM to NVMmn connected to the channels CH1 to CHm. For example, the storage controller 200 may transmit the command CMDa and the address ADDRa to the first channel CH1 to control a selected one among the nonvolatile memory devices NVM to NVM1n.

Each of the nonvolatile memory devices NVM11 to NVMmn may operate according to the control of the storage controller 200. For example, the nonvolatile memory device NVM11 may program the data DATAa in accordance with the command CMDa, the address ADDRa, and the data DATAa provided to the first channel CH1. For example, the nonvolatile memory device NVM21 may read the data DATAb in accordance with the command CMDb and the address ADDRb provided to the second channel CH2, and transmit the read data DATAb to the storage controller 200.

Although FIG. 3 shows an example in which the nonvolatile memory 400 communicates with the storage controller 200 through m channels, and the nonvolatile memory 400 includes n nonvolatile memory devices to correspond to each channel, the number of channels and the number of nonvolatile memory devices connected to one channel may be variously changed.

Figure 4:
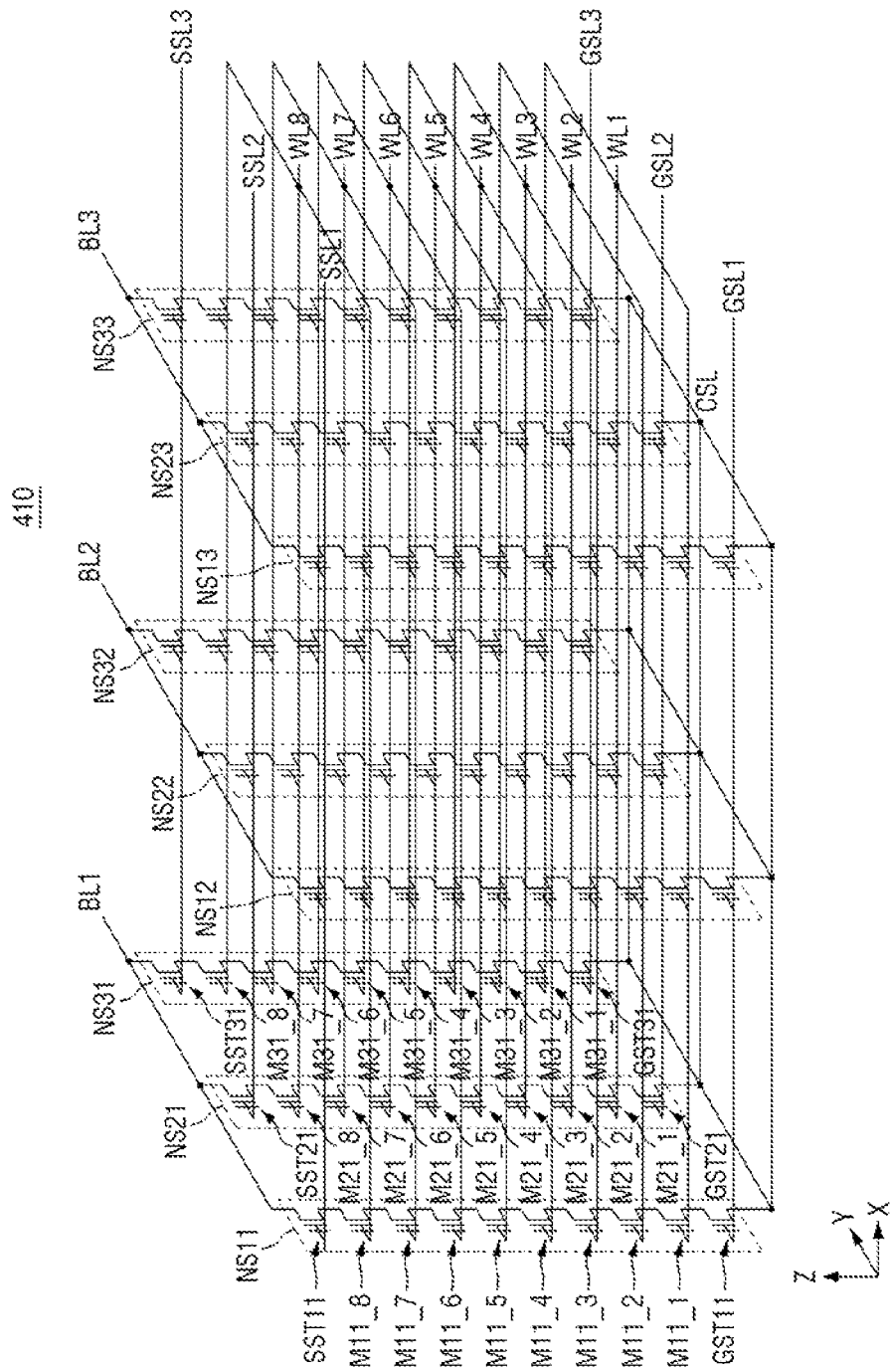
FIG. 4 is a circuit diagram showing a memory cell array according to some embodiments of the present disclosure.

FIG. 4 is a circuit diagram showing a memory cell array according to some embodiments of the present disclosure.

Referring to FIG. 4, a plurality of cell strings NS11, NS21, NS31, NS12, NS22, NS32, NS13, NS23, and NS33 may be placed on a substrate in a first direction x and a second direction y. The plurality of cell strings NS11, NS21, NS31, NS12, NS22, NS32, NS13, NS23, and NS33 may have a form extending in a third direction z. The plurality of cell strings NS11, NS21, NS31, NS12, NS22, NS32, NS13, NS23, and NS33 may be connected in common to a common source line CSL formed on the substrate or inside the substrate. Although the common source line CSL is shown as being connected to lowermost ends of the plurality of cell strings NS11, NS21, NS31, NS12, NS22, NS32, NS13, NS23, and NS33 in the third direction z, the common source line CSL may be electrically connected to the lowermost ends of the plurality of cell strings NS11, NS21, NS31, NS12, NS22, NS32, NS13, NS23, and NS33 in the third direction z, and the present disclosure is not limited to a configuration in which the common source line CSL is physically located at the lower ends of the plurality of cell strings NS11, NS21, NS31, NS12, NS22, NS32, NS13, NS23, and NS33. Further, although the plurality of cell strings NS11, NS21, NS31, NS12, NS22, NS32, NS13, NS23, and NS33 are shown as being placed in a 3×3 array in FIG. 4, the arrangement and the number of plurality of cell strings placed in the memory cell array 410 are not limited thereto. For example, number of the plurality of cell strings may be increased to form a 4×4 array.

Some cell strings NS11, NS12, and NS13 may be connected to a first ground select line (GSL) GSL1. Some cell strings NS21, NS22, and NS23 may be connected to a second ground select line GSL2. Some cell strings NS31, NS32, and NS33 may be connected to a third ground select line GSL3.

Further, some cell strings NS11, NS12, and NS13 may be connected to a first string select line (SSL) SSL1. Some cell strings NS21, NS22, and NS23 may be connected to a second string select line SSL2. Some cell strings NS31, NS32, and NS33 may be connected to a third string select line SSL3.

Each of the plurality of cell strings NS11, NS21, NS31, NS12, NS22, NS32, NS13, NS23, and NS33 may include a string select transistor connected to each of the string select lines SSL1-SSL3. Further, each of the plurality of cell strings NS11, NS21, NS31, NS12, NS22, NS32, NS13, NS23, and NS33 may include a ground select transistor connected to each of the ground select lines GSL1-GSL3.

One end of the ground select transistor of each of the plurality of cell strings NS11, NS21, NS31, NS12, NS22, NS32, NS13, NS23, and NS33 may be connected to the common source line CSL. Further, each of the plurality of cell strings NS11, NS21, NS31, NS12, NS22, NS32, NS13, NS23, and NS33 may have a plurality of memory cells stacked in order in the third direction z between the ground select transistor and the string select transistor. Each of the plurality of cell strings NS11, NS21, NS31, NS12, NS22, NS32, NS13, NS23, and NS33 may include a dummy cell between the ground select transistor and the string select transistor. The number of string select transistors included in each string is not limited to what is shown in FIG. 4.

For example, the cell string NS11 may include a ground select transistor GST11 placed at the lowermost end in the third direction z, a plurality of memory cells M11_1, M11_2, M11_3, M11_4, M11_5, M11_6, M11_7 and M11_8 stacked in order in the third direction z on the ground select transistor GST11, and a string select transistor SST11 stacked in the third direction z on the uppermost memory cell M11_8. Further, the cell string NS21 may include a ground select transistor GST21 placed at the lowermost end in the third direction z, a plurality of memory cells M21_1, M21_2, M21_3, M21_4, M21_5, M21_6, M21_7 and to M21_8 stacked in order in the third direction z on the ground select transistor GST21, and a string select transistor SST21 stacked in the third direction z on the uppermost memory cell M21_8. Further, the cell string NS31 may include a ground select transistor GST3_1 placed at the lowermost end in the third direction z, a plurality of memory cells M31_1, M31_2, M31_3, M31_4, M31_5, M31_6, M31_7 and to M31_8 stacked in order in the third direction z on the ground select transistor GST31, and a string select transistor SST31 stacked in the third direction z on the uppermost memory cell M31_8. Hereinafter, the configurations of other strings may also be similar thereto.

Memory cells located at the same height in the third direction z from the substrate or the corresponding ground select transistor may be electrically connected in common through each word line. For example, the memory cells of the height at which the memory cells M11_1, M21_1, and M31_1 are formed may be connected to a first word line WL1. Further, the memory cells of the height at which the memory cells M11_2, M21_2, and M31_2 are formed may be connected to a second word line WL2. Hereinafter, since the arrangement and structure of the memory cells connected to a third word line WL3, a fourth word line WL4, a fifth word line WL5, a sixth word line WL6, a seventh word line WL7 and an eighth word line WL8 are also similar thereto, the description thereof will not be provided.

One end of the string select transistor of each of the plurality of cell strings NSI 1, NS21, NS31, NS12, NS22, NS32, NS13, NS23, and NS33 may be connected to bit lines BL1, BL2, and BL3. For example, the string select transistors SST11, SST21, and SST31 may be connected to the bit line BL1 extending in the second direction y. Since the description of the other string select transistors connected to the bit lines BL2 and BL3 is also similar thereto, the description thereof will not be provided.

The memory cells corresponding to one string (or ground) select line and one word line may form one page. The write operation and the read operation may be performed in units of each page. Each memory cell on each page may store two or more bits. The bits written to the memory cells of each page may form logical pages.

The memory cell array 410 may be provided as a three-dimensional memory array. The three-dimensional memory array may be formed monolithically at one or more physical levels of the arrays of the memory cells having an active region placed on the substrate and a circuit related to the operation of the memory cells. The circuit related to the operation of the memory cells may be placed inside or above the substrate. The expression "formed monolithically" may mean that layers of each level of the three-dimensional array may be deposited directly on the layers of a lower level of the three-dimensional array.

Hereinafter, the storage device that performs a reclaim operation will be described referring to FIGS. 5 to 11.

Figure 5:
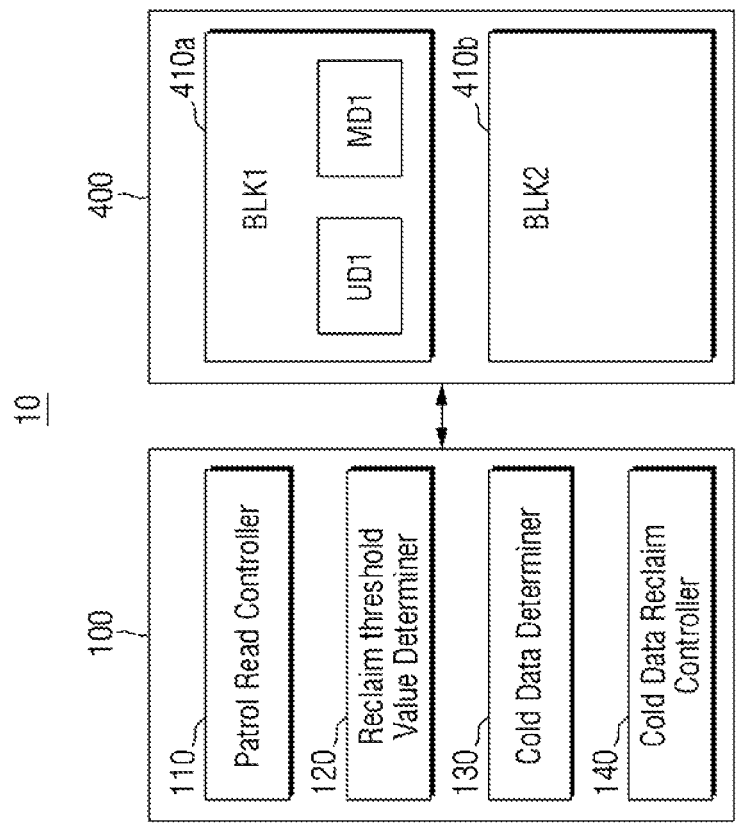
FIG. 5 is a block diagram of a reclaim controller and a nonvolatile memory according to some embodiments of the present disclosure.
Figure 6:
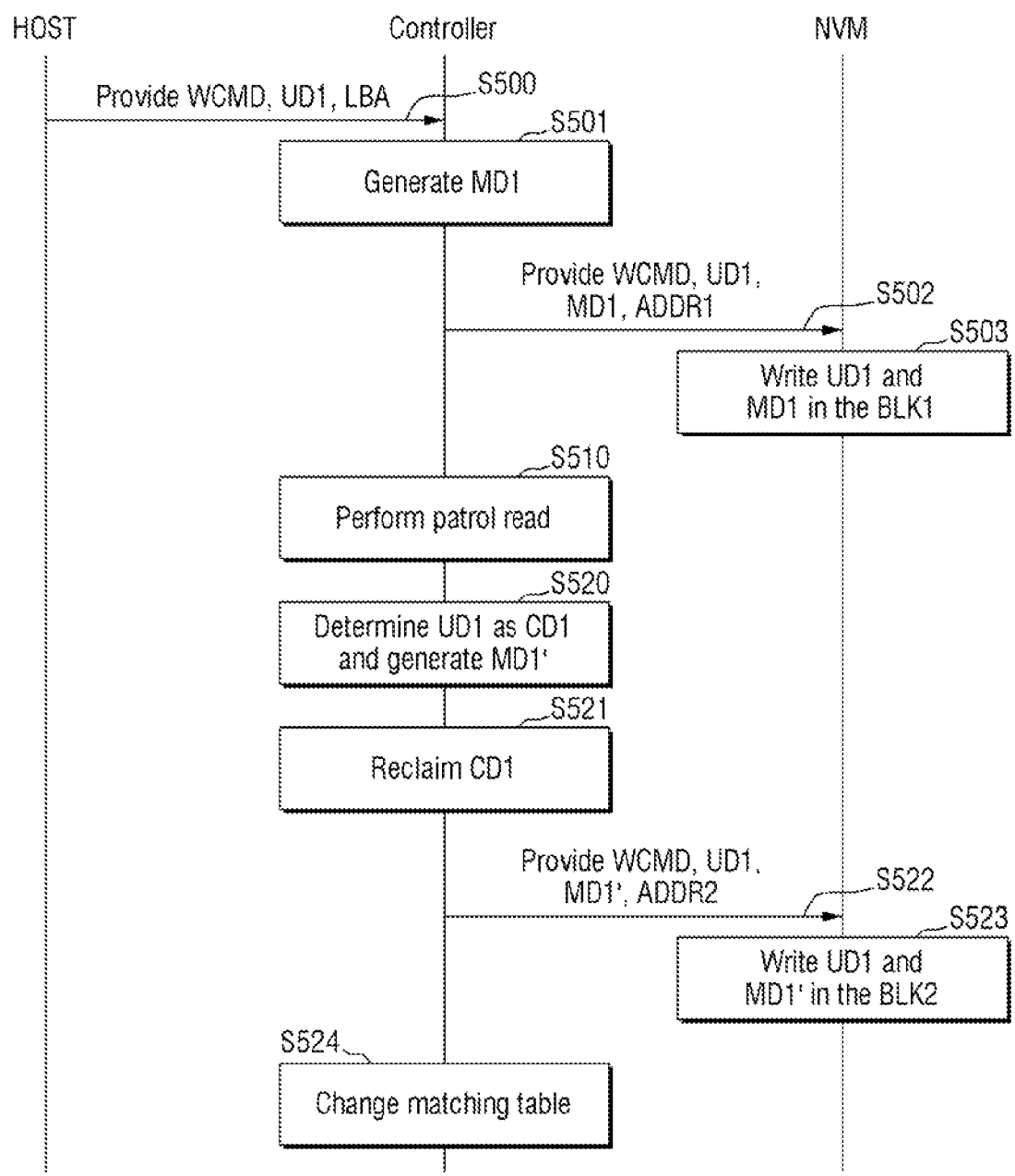
FIG. 6 is a ladder diagram for explaining the operation of the memory system according to some embodiments of the present disclosure.

FIG. 5 is a block diagram of a reclaim controller and a nonvolatile memory according to some embodiments of the present disclosure. FIG. 6 is a ladder diagram for explaining the operation of the memory system according to some embodiments of the present disclosure.

Referring to FIG. 5, the storage device 10 may include a reclaim controller 100 and a nonvolatile memory 400. The reclaim controller 100 may be included in the storage controller 200 shown in FIG. 1. For example, the reclaim controller 100 may be implemented by configuration of the storage controller 200. However, the embodiments of the present disclosure are not limited thereto. For example, the reclaim controller 100 may be implemented by the nonvolatile memory 400, and may be implemented by a firmware. In the present specification, an example in which the reclaim controller 100 controls the reclaim operation on the nonvolatile memory 400 will be described.

First, the nonvolatile memory 400 may include a first memory block 410a and a second memory block 410b. Here, the first memory block 410a and the second memory block 410b may be included in the memory cell array 410. In other words, a part of the memory cell array 410 may correspond to the first memory block 410a, and another part of the memory cell array 410 may correspond to the second memory block 410b. The first memory block 410a and the second memory block 410b may be physically separated.

Further, the first memory block 410a and the second memory block 410b may have different characteristics from each other. For example, the first memory block 410a may have a memory cell corresponding to a single level cell (SLC), and the second memory block 410b may have a memory cell corresponding to at least one of a multi level cell (MLC), a triple level cell (TLC), and a quad level cell (QLC).

Here, the memory cell corresponding to the SLC may store data having 1 bit. However, the memory cell corresponding to the MLC may store data having 2 bits, the memory cell corresponding to the TLC may store data having 3 bits, and the memory cell corresponding to the QLC may store data having 4 bits. In other words, the capacity of the data stored in the memory cell corresponding to the SLC may be smaller than the capacity of the data stored in the memory cell corresponding to the MLC, TLC and QLC. Therefore, when the first memory block 410a and the second memory block 410b occupy the same area, the capacity of the data stored in the first memory block 410a may be smaller than the capacity of the data stored in the second memory block 410b.

Further, the first memory block 410a may include the MLC, and the second memory block 410b may include at least one of the TLC and QLC. In other words, the capacity of the data stored in the memory cell of the first memory block 410a may be smaller than the capacity of the data stored in the memory cell of the second memory block 410b. Further, the operating speed of the memory cell of the first memory block 410a may be higher than the operating speed of the memory cell of the second memory block 410b.

The reclaim controller 100 may include a patrol read controller 110, a reclaim threshold value determiner 120, a cold data determiner 130, and a cold data reclaim controller 140. The patrol read controller 110, the reclaim threshold value determiner 120, the cold data determiner 130, and the cold data reclaim controller 140 may correspond to the functions implemented by the reclaim controller 100 or the storage controller 200. The patrol read controller 110, the reclaim threshold value determiner 120, the cold data determiner 130, and the cold data reclaim controller 140 may correspond to circuits implemented in the reclaim controller 100.

In some embodiments of the present disclosure, the patrol read controller 110 may perform a patrol read on the nonvolatile memory 400. The memory cell array 410 included in the nonvolatile memory 400 may include a plurality of memory cells. As time goes on, the charge stored in at least one of the memory cells may change, and the memory cell may deteriorate. For example, retention may occur in the nonvolatile memory 400. In other words, a dispersion of memory cells may differ from an initial dispersion. Therefore, additional processing may be required for the memory cells subjected to retention.

The patrol read controller 110 may apply a monitoring voltage to the memory cells of the nonvolatile memory 400. The patrol read controller 110 may determine whether the memory cells included in the nonvolatile memory 400 deteriorate. After a long time has passed after data is programmed in the nonvolatile memory 400, the memory cell to which the data was programmed may deteriorate, and the patrol read controller 110 may detect the deteriorated memory cell. For example, the patrol read controller 110 may perform a patrol read on first user data UD1 stored in the first memory block 410a, and may determine whether the first user data UD1 deteriorates. For example, when the voltage applied to the memory cell in which the first user data UD1 is stored is equal to or less than a specific voltage, the patrol read controller 110 may determine the first user data UD1 as deterioration data.

The reclaim threshold value determiner 120 may determine a threshold value that serves as a reference for performing the reclaim. For example, the reclaim threshold value determiner 120 may determine a threshold value that becomes a reference used by the cold data determiner 130. A detailed threshold value determining method of the reclaim threshold value determiner 120 will be described later.

The cold data determiner 130 may determine whether the data stored in the nonvolatile memory 400 is cold data. The cold data may correspond to the data stored in the memory cell which has deteriorated to the point that it needs to be reclaimed. The cold data determiner 130 may determine the user data determined by the patrol read controller 110 as cold data. For example, the cold data determiner 130 may determine the user data as cold data, by comparing the threshold value determined by the reclaim threshold value determiner 120 with the reclaim count of the user data. A more detailed explanation thereof will be provided later.

The cold data reclaim controller 140 may perform a reclaim on the determined cold data. For example, the cold data reclaim controller 140 may copy the cold data and provide the copied cold data to other memory blocks.

Referring to FIGS. 1, 5 and 6, the host device 20 may provide the storage controller 200 with a write command WCMD, a logical block address LBA, and a first user data UD1 (S500). The storage controller 200 may generate a first address ADDR1 that matches with the logical block address LBA through the flash translation layer 214. Here, the logical block address LBA and the first address ADDR1 may be matched by a matching table. The storage controller 200 may generate a first metadata MD1 (S501). For example, the storage controller 200 may generate the first metadata MD1 on the basis of the first user data UD1. Here, the first metadata MD1 may include information about the first metadata MD1 stored in the nonvolatile memory 400 and the memory cell array 410 in which the first metadata MD1 is stored. However, the present disclosure is not limited thereto. Subsequently, the storage controller 200 may provide the nonvolatile memory 400 with the write command WCMD, the first user data UD1, the first metadata MD1, and the first address ADDR1 (S502).

The nonvolatile memory 400 may write the first user data UD1 and the first metadata MD1 to the first memory block 410a (S503). For example, the nonvolatile memory 400 may program the first user data UD1 and the first metadata MD1 to the first memory block 410a corresponding to the first address ADDR1. The first user data UD1 and the first metadata MD1 may be programmed into different portions of the first memory block 410a. Here, the first metadata MD1 may be updated by the storage controller 200. As time goes on, the first user data UD1 stored in the first memory block 410a may deteriorate. In other words, the retention of the first user data UD1 may progress (e.g., worsen).

After the first user data UD1 and the first metadata MD1 are written, the storage controller 200 may perform the patrol read (S510).

Figure 7:
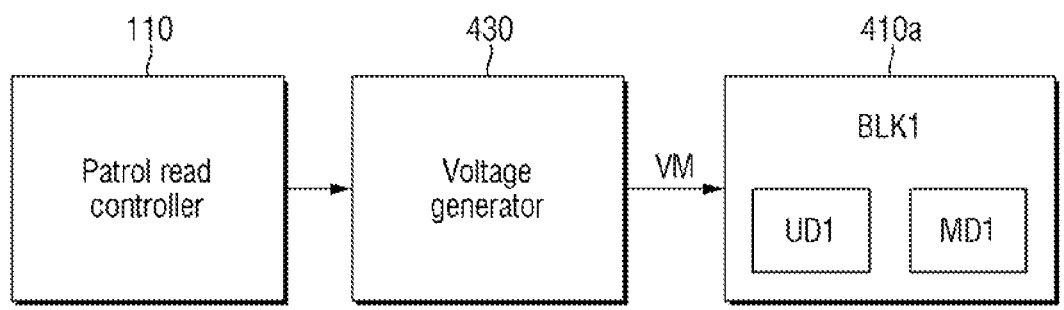
FIG. 7 is a diagram for explaining a patrol read.
Figure 8:
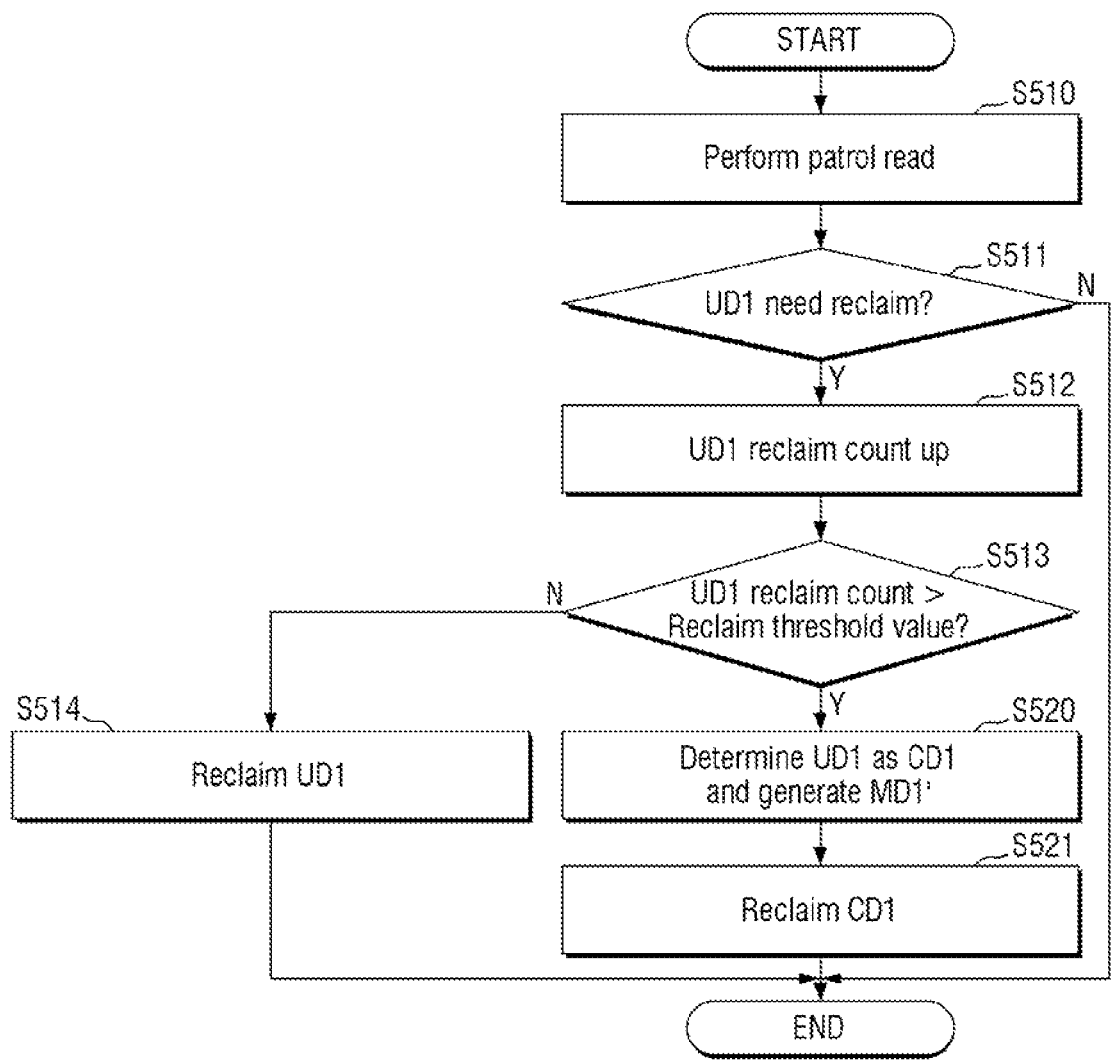
FIG. 8 is a flowchart for explaining a reclaim count-up and a cold data reclaim according to some embodiments of the present disclosure.

FIG. 7 is a diagram for explaining the patrol read. FIG. 8 is a flowchart for explaining a reclaim count-up and a cold data reclaim according to some embodiments of the present disclosure.

Referring to FIG. 7, the patrol read controller 110 may control the voltage generator 430 of the nonvolatile memory 400. For example, the voltage generator 430 may apply a monitor voltage VM to the memory cell array 410 to perform the patrol read. As the monitoring voltage VM is applied to the first memory block 410a, it is possible to determine whether the memory cell in which the first user data UD1 is stored deteriorates. In other words, it is possible to determine whether the first user data UD1 deteriorates according to the voltage of the memory cell in which the first user data UD1 is stored.

Referring to FIG. 8, the reclaim controller 100 determines whether the first user data UD1 requires the reclaim (S511). In other words, the reclaim controller 100 may determine whether the first memory block 410a in which the first user data UD1 is stored deteriorates. When the monitoring voltage VM is applied and the output voltage is different from the reference voltage, the patrol read controller 110 may determine that the memory cell requires the reclaim. In other words, when the monitoring voltage VM is applied and the output voltage is different from the reference voltage, the patrol read controller 110 may determine that the first memory block 410a deteriorates.

When the first user data UD1 requires the reclaim (S511-Y), the reclaim count for the first user data UD1 may increase (S512). For example, a reclaim may have been performed previously on the first user data UD1. When the reclaim count for the first user data UD1 is n previously, the reclaim controller 100 may increase the reclaim count for the first user data UD1 to n+1. In other words, the reclaim controller 100 may update the reclaim count for the first user data UD1.

If the first user data UD1 does not require the reclaim (S511-N), the patrol read may be terminated. In other words, if the first user data UD1 does not require the reclaim, the reclaim count for the first user data UD1 may not increase.

After the reclaim count for the first user data UD1 increases, the reclaim controller 100 may determine whether the reclaim count for the first user data UD1 is greater than the reclaim threshold value (S513). Here, the reclaim threshold value may be determined by the reclaim threshold value determiner 120.

Figure 10:
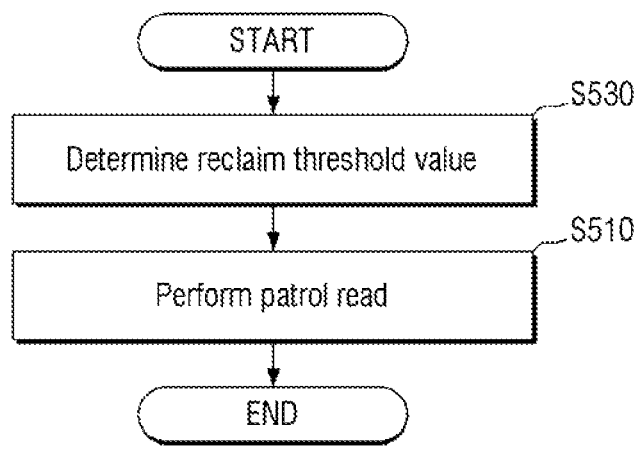
FIG. 10 is a flowchart explaining the operation of a threshold value determiner of FIG. 5.

FIG. 10 is a flowchart explaining the operation of the reclaim threshold value determiner of FIG. 5.

The reclaim threshold determiner 120 may determine the reclaim threshold value (S530), before performing the patrol read (S510). The reclaim threshold value determiner 120 may determine the reclaim threshold value, on the basis of the retention value deviation of the first and second memory blocks 410a and 410b, a cold data acceptance limit of the first and second memory blocks 410a and 410b, a garbage collection overhead state, and the like. For example, the reclaim controller 100 may determine the reclaim threshold value, on the basis of a deletion count of the first memory block 410a and a deletion count of the second memory block 410b. Therefore, a large amount of cold data may be determined when the reclaim threshold value is small, and a small amount of cold data may be determined when the reclaim threshold value is large.

Referring back to FIGS. 6 and 8, when the reclaim count for the first user data UD1 is larger than the reclaim threshold value (S513-Y), the reclaim controller 100 determines the first user data UD1 as the first cold data CD1, and may generate a first metadata MD1' (S520). In other words, the reclaim controller 100 may compare the reclaim count for the first user data UD1 with the reclaim threshold value to determine whether the first user data UD1 is cold data. In other words, the first user data UD1 may be determined as cold data through a process of determining whether the first user data UD1 requires the reclaim (S511) and the comparison of the reclaim count for the first user data UD1 with the reclaim threshold value (S513). This makes it possible to provide the storage device 10 having increased performance.

In addition, the first metadata MD1' generated in (S520) may include the reclaim count for the first user data UD1. The reclaim controller 100 or the storage controller 200 may increase the performance and life of the storage device 10, by using the first metadata MD1' including the reclaim count for the first user data UD1 in the wear-leveling, the garbage collection, and the like. It is to be understood that current techniques, the cold data is classified using only the read count for the user data. However, in the embodiment of the present disclosure, by classifying the cold data on the basis of the reclaim count, and using the reclaim count in the operations such as the wear-leveling and the garbage collection, the storage device 10 is provided with increased performance.

For example, the reclaim controller 100 may distribute data to each region of the memory cell array 410, according to the life of each region of the memory cell array 410 on the basis of the first metadata MD1. Further, in the wear-leveling operation, the reclaim controller 100 may provide data to a memory block having a high erase count.

The reclaim controller 100 may perform the reclaim on the first cold data CD1 (S521). For example, the reclaim controller 100 may perform the reclaim on the first user data UD1 determined as the first cold data CD1. Referring to FIG. 6 again, the storage controller 200 may provide the write command WCMD, the first user data UD1, the first metadata MD1', and the second address ADDR2 to the nonvolatile memory 400 (S522). Accordingly, the nonvolatile memory 400 may write the first user data UD1 and the first metadata MD1' to the second memory block 410b (S523).

Figure 9:
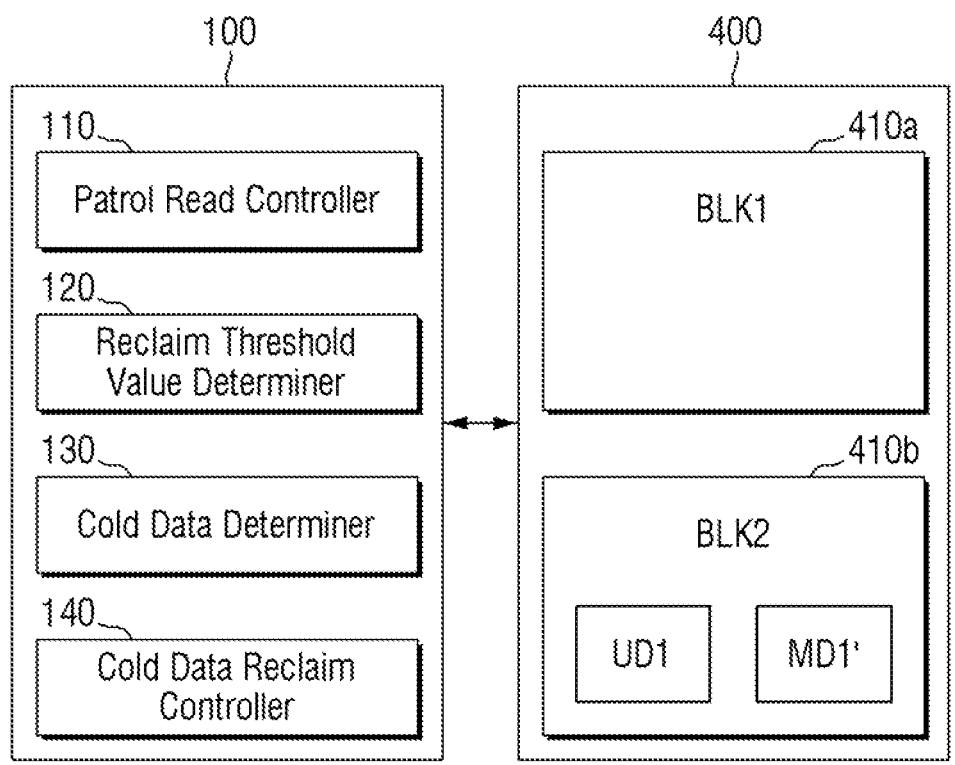
FIG. 9 is a block diagram of a reclaimed nonvolatile memory.

FIG. 9 is a block diagram of the reclaimed nonvolatile memory.

Referring to FIG. 9, the first user data UD1 stored in the first memory block 410a may move to the second memory block 410b, by the cold data reclaim controller 140 of the reclaim controller 100. In other words, the first memory block 410a may delete the first user data UD1, and the second memory block 410b may write the first user data UD1. Further, the first metadata MD1' including the counted-up reclaim count may be written to the second memory block 410b. Therefore, the reclaim controller 100 may access the second memory block 410b to derive the first metadata MD1'.

The storage capacity of the memory cell included in the second memory block 410b may be greater than the storage capacity of the memory cell included in the first memory block 410a. In other words, when the second memory block 410b is TLC, the first memory block 410a may be SLC. By storing the first user data UD1 corresponding to the first cold data CD1 in the second memory block 410b having a higher bit density, the storage device 10 has further increased performance.

Referring back to FIGS. 6 and 8, when the reclaim count for the first user data UD1 is not greater than the reclaim threshold value (S513-N), the reclaim controller 100 may perform the reclaim on the first user data UD1 (S514). In this case, the reclaim controller 100 may not determine the first user data UD1 as cold data. Therefore, the first metadata MD1' may not be generated, and the existing first metadata MD1 may be maintained. In other words, the first metadata MD1 may remain in the first memory block 410a. In this case, the reclaim operation on the first user data UD1 may be different from the reclaim operation on the first user data UD1 determined as the first cold data CD1. For example, the reclaim operation of S514 may correspond to movement of the first user data UD1 to the pre-block of the memory cell array 410. However, the reclaim operation of S521 may correspond to movement of the first user data UD1 to a second memory block 410b having a higher bit density.

Figure 11:
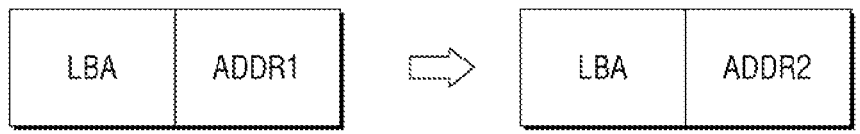
FIG. 11 is a diagram of a change of a matching table according to some embodiments of the present disclosure.

FIG. 11 is a diagram of a change of the matching table according to some embodiments.

Referring to FIGS. 6 and 11, the storage controller 200 may change the matching table (S524). For example, a first matching table MT1 before the reclaim is performed may include information about the first address ADDR1 matched to the logical block address LBA. A second matching table MT2 after the reclaim is performed may include information about the second address ADDR2 matched to the logical block address LBA. In other words, the storage controller 200 may change the matching table matched to the logical block address LBA according to the execution of the reclaim.

Here, the first address ADDR1 may correspond to the first memory block 410a, and the second address ADDR2 may correspond to the second memory block 410b. In other words, as the reclaim count increases and the reclaim is performed on the first cold data CD1, the matching table may be changed from the first address ADDR1 to the second address ADDR2. This may correspond to an interface between the storage controller 200 and the nonvolatile memory 400.

Figure 12:
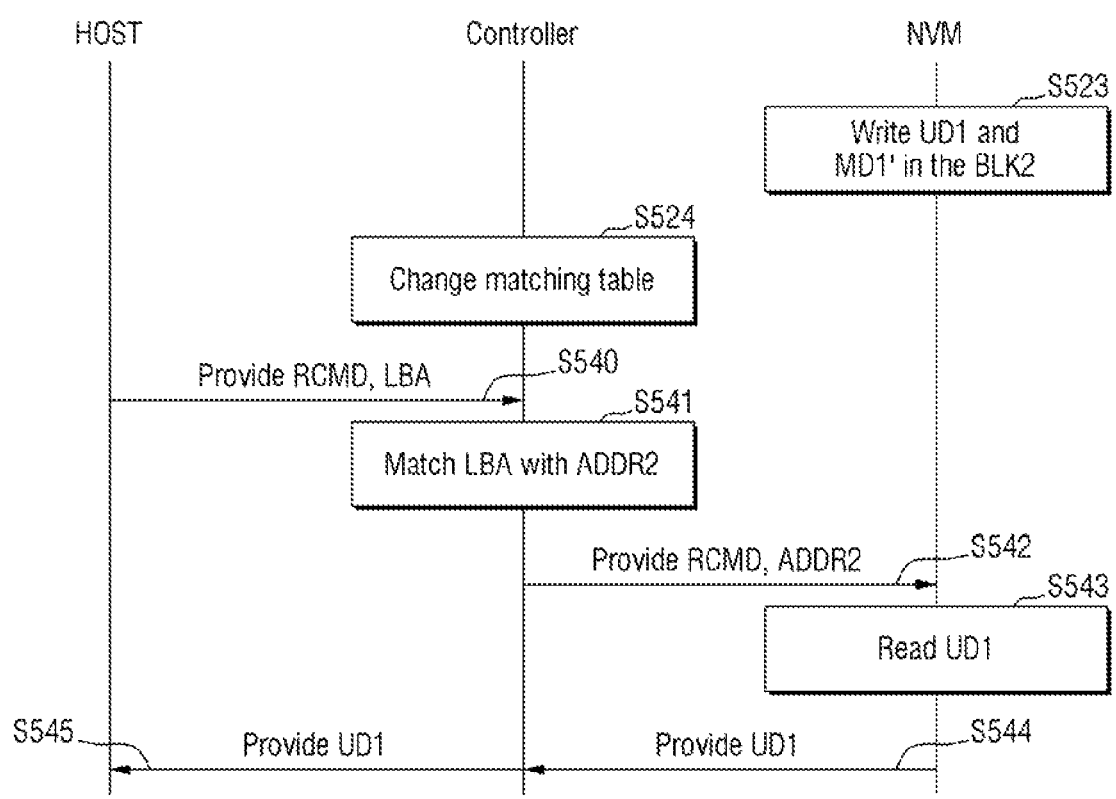
FIG. 12 is a ladder diagram for explaining a read operation of first user data according to some embodiments of the present disclosure.

FIG. 12 is a ladder diagram for explaining a read operation of the first user data according to some embodiments of the present disclosure.

Referring to FIG. 12, after the matching table is changed (S524), the host device 20 may provide a read command RCMD and the logical block address LBA to the storage controller 200 (S540). The storage controller 200 may match the logical block address LBA to the second address ADDR2 (S541). In other words, the storage controller 200 may derive the second address ADDR2 according to the second matching table MT2.

Subsequently, the storage controller 200 may provide the read command RCMD and the second address ADDR2 to the nonvolatile memory 400 (S542). The nonvolatile memory 400 may read the first user data UD1 (S543). For example, the nonvolatile memory 400 may read the first user data UD1 from the second memory block 410b corresponding to the second address ADDR2. Here, the first user data UD1 may be stored in the second memory block 410b other than the first memory block 410a.

The nonvolatile memory 400 may then provide the storage controller 200 with the first user data UD1 (S544), and the storage controller 200 may provide the host device 20 with the first user data UD1 (S545). Since the first user data UD1 corresponding to the cold data is stored in the second memory block 410b having a low performance, the first memory block 410a having a relatively high performance may be used more efficiently.

Hereinafter, a storage device 10' according to another embodiment of the present disclosure will be described referring to FIGS. 13 and 14.

Figure 13:
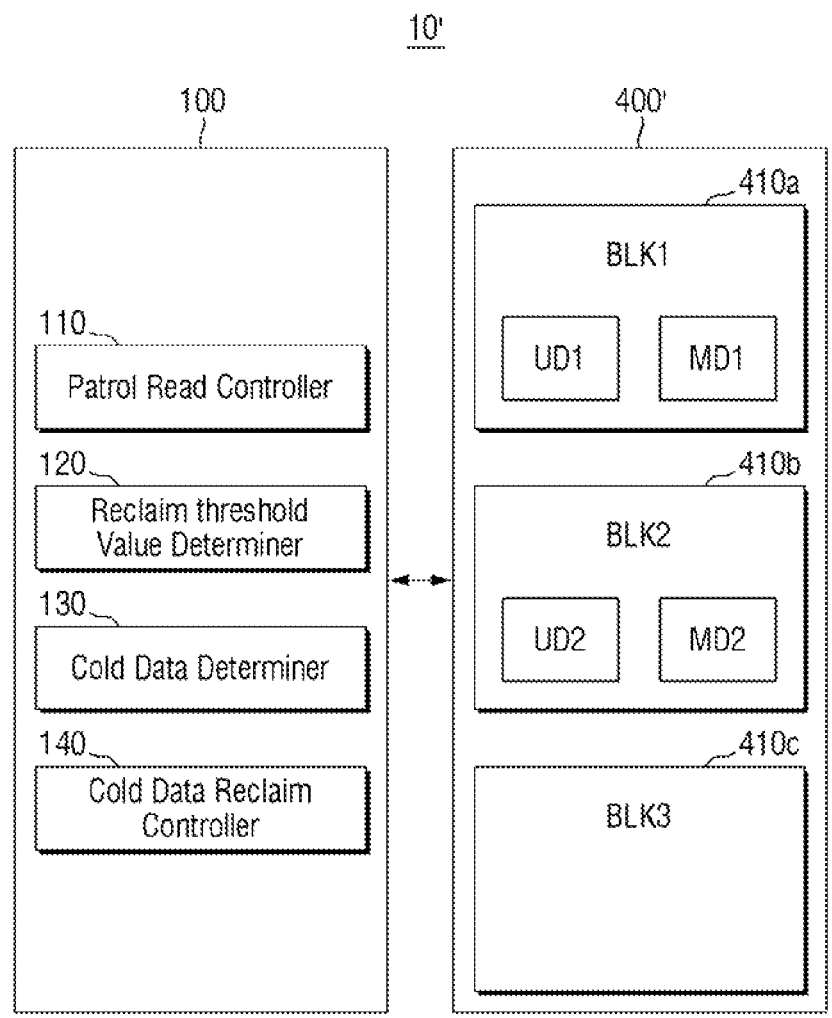
FIG. 13 is a block diagram of a storage device including a plurality of memory blocks according to some embodiments of the present disclosure.
Figure 14:
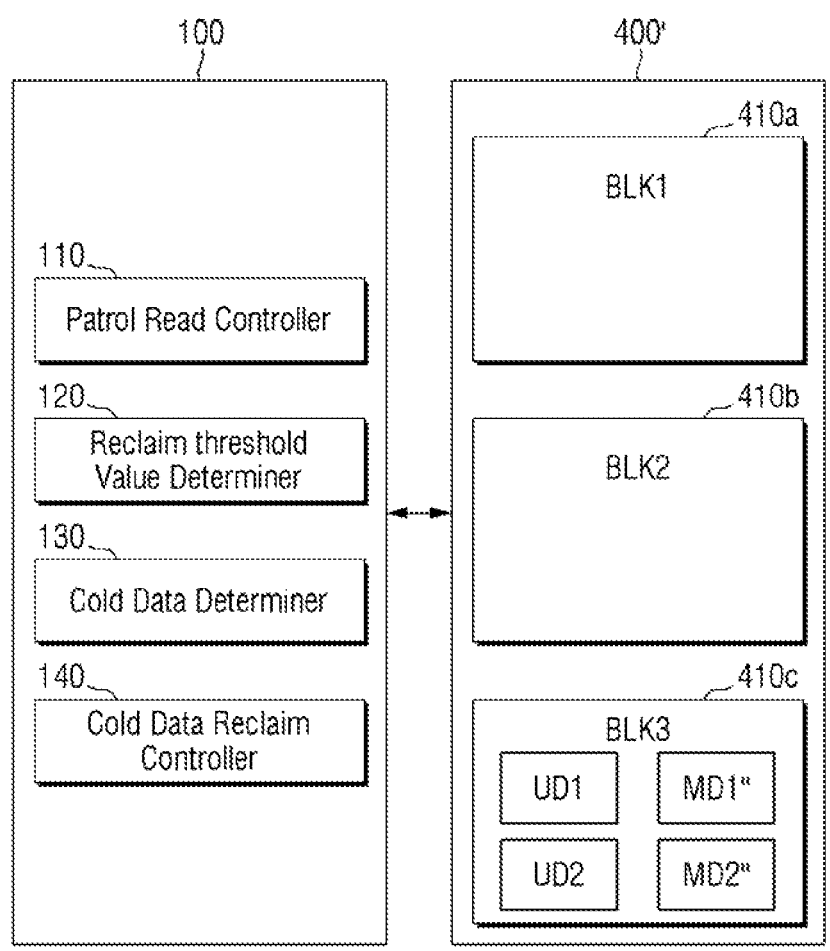
FIG. 14 is a block diagram of a storage device including a plurality of memory blocks according to some embodiments of the present disclosure.

FIGS. 13 and 14 are block diagrams of a storage device including a plurality of memory blocks according to some embodiments of the present disclosure. For convenience, repeated parts of contents explained using FIGS. 1 to 12 will be briefly described or omitted.

Referring to FIG. 13, the storage device 10' may include a reclaim controller 100 and a nonvolatile memory 400'. Here, the nonvolatile memory 400' may include a plurality of memory blocks. For example, the nonvolatile memory 400' may include a first memory block 410a, a second memory block 410b, and a third memory block 410c. Unlike the example in which the nonvolatile memory 400 described referring to FIGS. 1 to 12 includes only the first memory block 410a and the second memory block 410b, the nonvolatile memory 400' may further include the third memory block 410c.

The first memory block 410a may store a first user data UD1 and a first metadata MD1, and the second memory block 410b may store a second user data UD2 and a second metadata MD2. Here, the first metadata MD1 may include a reclaim count for the first user data UD1, and the second metadata MD2 may include a reclaim count for the second user data UD2.

Referring to FIG. 14, the reclaim controller 100 may perform the reclaim on the first user data UD1 stored in the first memory block 410a and the second user data UD2 stored ill the second memory block 410b. In this case, the reclaim count for the first user data UD1 may increase, and the reclaim count for the second user data UD2 may increase. In other words, a first metadata MD1" including an increased reclaim count for the first user data UD1 may be generated, and a second metadata MD2" including an increased reclaim count for the second user data UD2 may be generated.

As the reclaim is performed on the first user data UD1 and the second user data UD2, the first user data UD1, the second user data UD2, the first metadata MD1" and the second metadata MD2" may be stored in the third memory block 410c. Here, the storage capacity of the memory cells included in the third memory block 410c may be greater than the storage capacity of the memory cells included in the first memory block 410a and the second memory block 410b. Since the reclaimed first user data UD1 and second user data UD2 are stored in the third memory block 410c, the performance of the storage device 10' may be further increased.

Hereinafter, a memory system 2 according to another embodiment of the present disclosure will be described referring to FIGS. 15 and 16.

Figure 15:
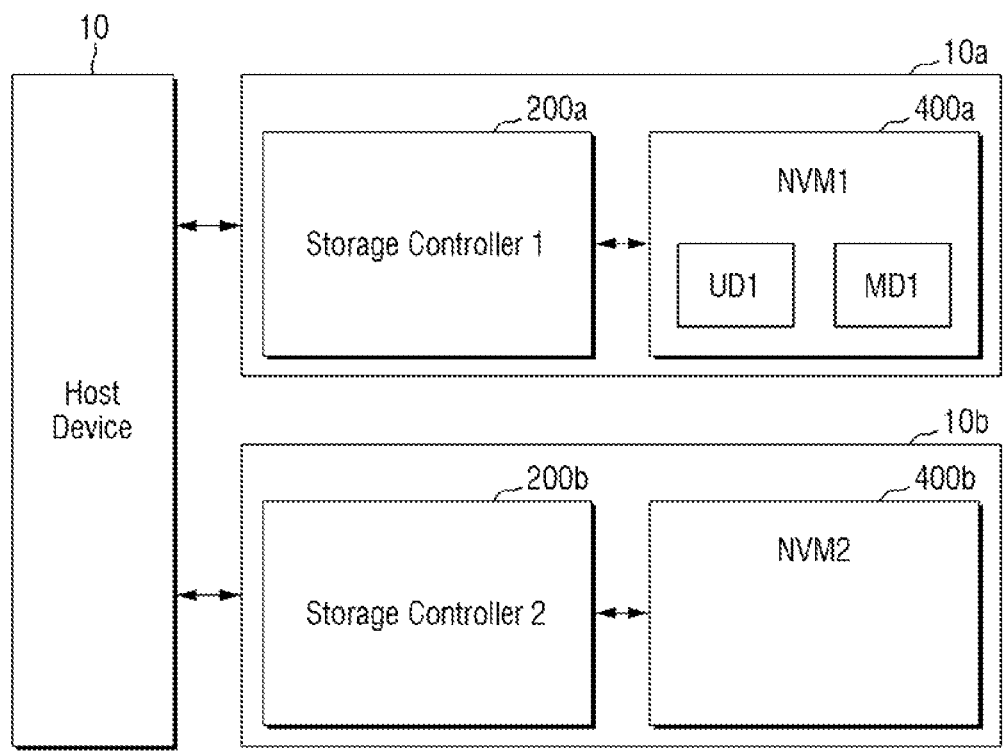
FIG. 15 is a diagram of a memory system including a plurality of storage devices according to some embodiments of the present disclosure.

FIG. 15 is a diagram of a memory system including a plurality of storage devices according to some embodiments of the present disclosure. FIG. 16 is a ladder diagram for explaining the operation of the memory system of FIG. 15. For convenience, repeated parts of contents explained using FIGS. 1 to 12 will be briefly described or omitted.

Referring to FIG. 15, the memory system 2 may include a host device 10, a first storage device 10a, and a second storage device 10b. The first storage device 10a and the second storage device 10b may be separated from each other.

The first storage device 10a may include a first storage controller 200a and a first nonvolatile memory 400a. The second storage device 10b may include a second storage controller 200b and a second nonvolatile memory 400b. Here, the first nonvolatile memory 400a may store the first user data UD1 and the first metadata MD1. The storage capacity of the memory cell included in the first nonvolatile memory 400a may be smaller than the storage capacity of the memory cell included in the second nonvolatile memory 400b. In other words, the first nonvolatile memory 400a and the second nonvolatile memory 400b may be different from each other.

Figure 16:
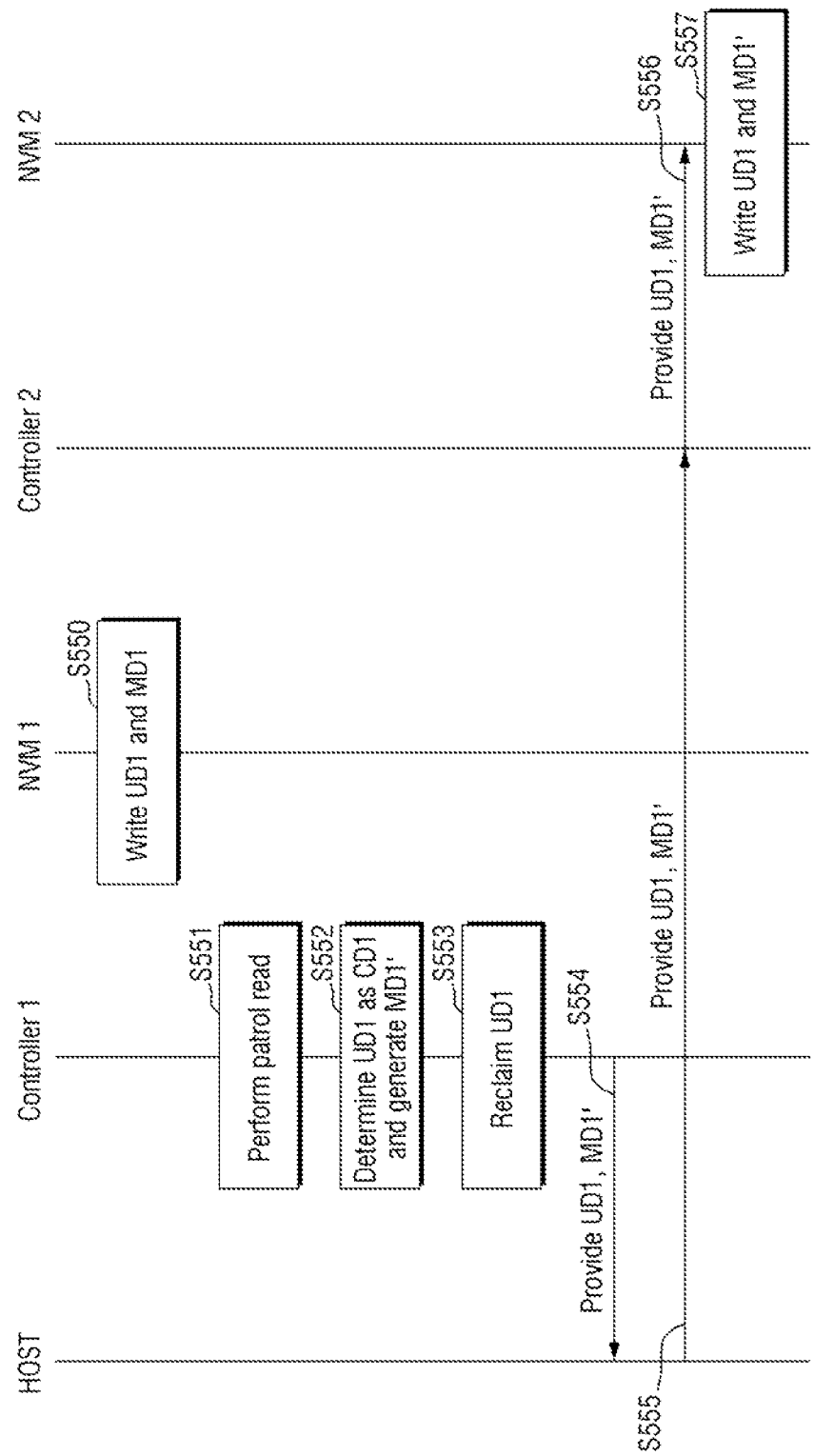
FIG. 16 is a ladder diagram for explaining the operation of the memory system of FIG. 15.

Referring to FIGS. 15 and 16, the first nonvolatile memory 400a may write the first user data UD1 and the first metadata MD1 (S550). Subsequently, the first storage controller 200a may perform the patrol read (S551). The first storage controller 200a may perform the patrol read on the first user data UD1 stored in the first nonvolatile memory 400a. The first storage controller 200a may determine the first user data UD1 as the first cold data CD1 and generate the first metadata MD1' accordingly (S552). At this time, if the reclaim count for the first user data UD1 is increased and the reclaim count for the first user data UD1 is greater than the reclaim threshold value, the storage controller 200a may perform the reclaim on the first user data UD1 (S553).

Since the reclaim on the first user data UD1 is performed, the first storage controller 200a may provide the first user data UD1 and the first metadata MD1' to the host device 10 (S554). The host device 10 may provide the first user data UD1 and the first metadata MD1' to the second storage controller 200b (S555).

Accordingly, the second storage controller 200b may provide the first user data UD1 and the first metadata MD1' to the second nonvolatile memory 400b (S556). As the reclaim is performed, the second nonvolatile memory 400b may write the first user data UD1 and the first metadata MD1' (S557).

In other words, since the reclaim is performed on the first user data UD1 stored in the first nonvolatile memory 400a, the first user data UD1 may be stored in the second nonvolatile memory 400b. Accordingly, the first nonvolatile memory 400a may be used more efficiently.

Figure 17:
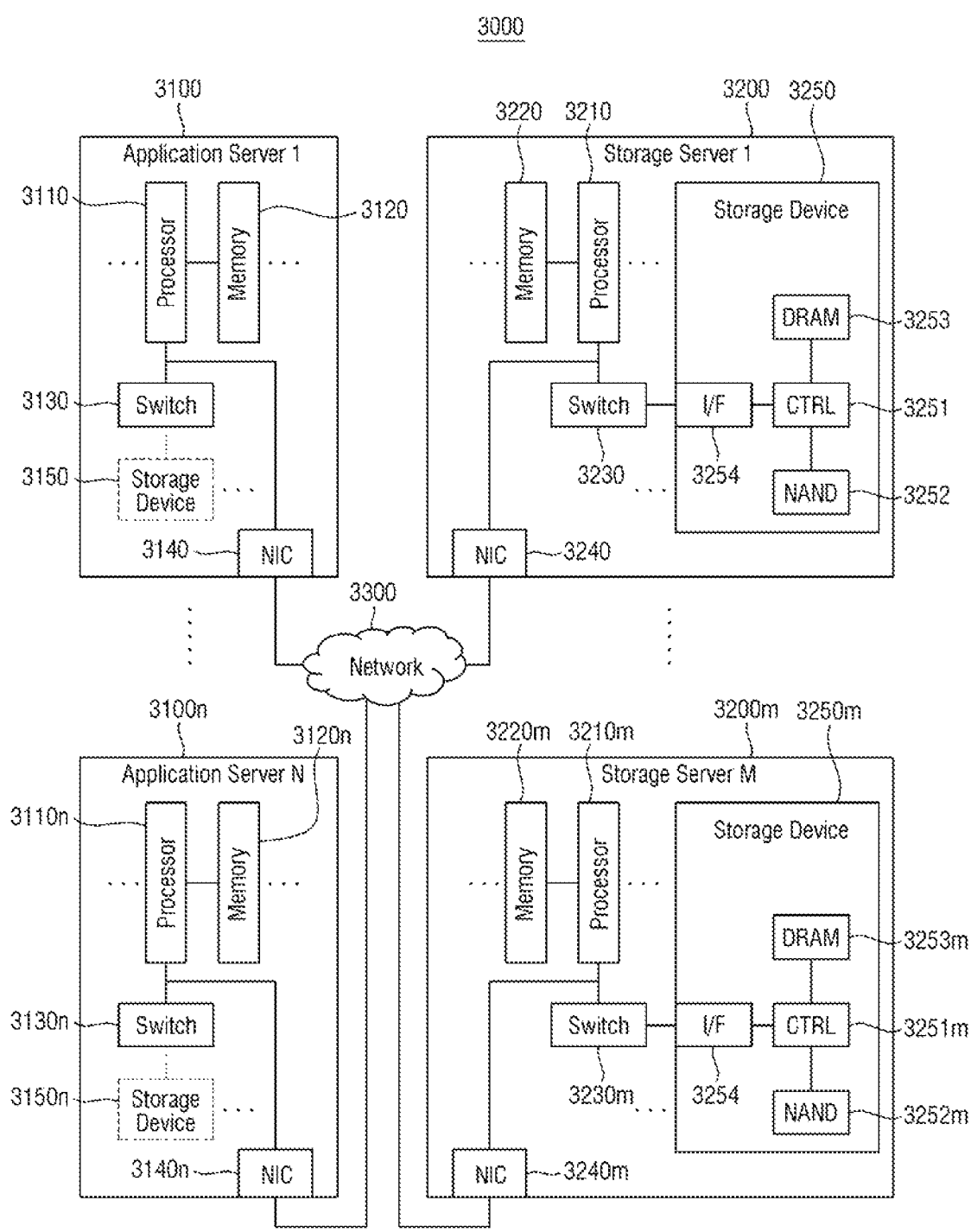
FIG. 17 is a diagram of a data center including a storage device according to some embodiments of the present disclosure.

FIG. 17 is a diagram of a data center including a storage device according to some embodiments of the present disclosure.

Referring to FIG. 17, a data center 3000 is a facility that gathers various types of data and provides services, and may also be called a data storage center. The data center 3000 may be a system for search engine and database operation, and may be a computing system used in corporations such as banks or government agencies. The data center 3000 may include application servers 3100 to 3100n and storage servers 3200 to 3200m. The number of application servers 3100 to 3100n and the number of storage servers 3200 to 3200m may be variously selected depending on the embodiments of the present disclosure, and the number of application servers 3100 to 3100n and the number of storage servers 3200 to 3200m may be different from each other.

The application server 3100 or the storage server 3200 may include at least one of processors 3110 and 3210 and memories 3120 and 3220. When the storage server 3200 is explained as an example, the processor 3210 may control the overall operations of the storage server 3200, and access the memory 3220 to execute instructions and/or data loaded into the memory 3220. The memory 3220 may be a Double Data Rate Synchronous DRAM (DDR SDRAM), a High Bandwidth Memory (HBM), a Hybrid Memory Cube (HMC), a Dual In-line Memory Module (DIMM), an Optane DIMM and/or a Non-Volatile DIMM (NVDIMM).

According to the embodiments of the present disclosure, the number of processors 3210 and the number of memories 3220 included in the storage server 3200 may be variously selected. In an embodiment of the present disclosure, the processor 3210 and the memory 3220 may provide a processor-memory pair. In an embodiment of the present disclosure, the number of processors 3210 and memories 3220 may be different from each other. The processor 3210 may include a single core processor or a multi-core processor. The aforementioned explanation of the storage server 3200 may also be similarly applied to the application server 3100. According to the embodiments of the present disclosure, the application server 3100 may not include a storage device 3150. The storage server 3200 may include at least one or more storage devices 3250. The number of storage devices 3250 included in the storage server 3200 may be variously selected depending on the embodiments. The storage device 3250 may include the storage device 10 described referring to FIGS. 1 to 16.

The application servers 3100 to 3100n and the storage servers 3200 to 3200m may communicate with each other through a network 3300. The network 3300 may be implemented, using a Fiber Channel (FC), an Ethernet, or the like. FC is a medium used for a relatively high-speed data transfer, and may use an optical switch that provides high performance/high availability. The storage servers 3200 to 3200m may be provided as file storage, a block storage or an object storage, depending on the access type of the network 3300.

In an embodiment of the present disclosure, the network 1300 may be a storage-only network such as a Storage region Network (SAN). For example, the SAN may be an FC-SAN which uses an FC network and is implemented according to FCP (FC Protocol). As another example, the SAN may be an IP-SAN which uses a TCP/IP network and is implemented according to an iSCSI (SCSI over TCP/IP or Internet SCSI) protocol. In still another embodiment of the present disclosure, the network 1300 may be a general network such as a TCP/IP network. For example, the network 1300 may be implemented, according to protocols such as an FCoE (FC over Ethernet), a NAS (Network Attached Storage), and an NVMe-oF (NVMe over Fabrics).

Hereinafter, the application server 3100 and the storage server 3200 will be mainly described. Explanation of the application server 3100 may also be applied to another application server 3100n, and explanation of the storage server 3200 may also be applied to another storage server 3200m.

The application server 3100 may store the data requested to be stored by a user or client in one of the storage servers 3200 to 3200m through the network 3300. Further, the application server 3100 may acquire the data requested to read by the user or client from one of the storage servers 3200 to 3200m through the network 3300. For example, the application server 3100 may be implemented as a Web server, a Database Management System (DBMS) or the like.

The application server 3100 may access a memory 3120n or a storage device 3150n included in another application server 3100n through the network 3300, or may access the memories 3220 to 3220m or the storage devices 3250 to 3250m included in the storage servers 3200 to 3200m through the network 3300. Accordingly, the application server 3100 may perform various operations on the data stored in the application servers 3100 to 3100n and/or the storage servers 3200 to 3200m. For example, the application server 3100 may execute instructions for moving or copying the data between the application servers 3100 to 3100n and/or the storage servers 3200 to 3200m. For example, the data may be moved from the storage devices 3250 to 3250m of the storage servers 3200 to 3200m via the memories 3220 to 3220m of the storage servers 3200 to 3200m, or may be directly moved to the memories 3120 to 3120n of the application servers 3100 to 3100n. Data which moves through the network 3300 may be data encrypted for security or privacy.

When the storage server 3200 is explained as an example, an interface 3254 may provide a physical connection between the processor 3210 and a controller 3251, and a physical connection between the Network InterConnect (NIC) 3240 and the controller 3251. For example, the interface 3254 may be implemented in a Direct Attached Storage (DAS) type in which the storage device 3250 is directly connected with a dedicated cable. Further, for example, the interface 3254 may be implemented in various interface types, such as an Advanced Technology Attachment (ATA), a Serial ATA (SATA), an external SATA (e-SATA), a Small Computer Small Interface (SCSI), a Serial Attached SCSI (SAS), a Peripheral Component Interconnection (PCI), a PCI express (PCIe), a NVM express (NVMe), an IEEE 1394, a universal serial bus (USB), a secure digital (SD) card, a multi-media card (MMC), an embedded multi-media card (eMMC), a Universal Flash Storage (UFS), an embedded Universal Flash Storage (eUFS), and/or a compact flash (CF) card interface.

The storage server 3200 may further include a switch 3230 and a NIC 3240. The switch 3230 may selectively connect the processor 3210 and the storage device 3250 or may selectively connect the NIC 3240 and the storage device 3250, according to the control of the processor 3210.

In an embodiment of the present disclosure, the NIC 3240 may include a network interface card, a network adapter, and the like. The NIC 3240 may be connected to the network 3300 by a wired interface, a wireless interface, a Bluetooth interface, an optical interface, or the like. The NIC 3240 may include an internal memory, a Digital Signal Processor (DSP), a host bus interface, or the like, and may be connected to the processor 3210 and/or the switch 3230, or the like through the host bus interface. The host bus interface may also be implemented as one of the examples of the interface 3254 described above. In an embodiment of the present disclosure, the NIC 3240 may also be integrated with at least one of the processor 3210, the switch 3230, and the storage device 3250.

In the storage servers 3200 to 3200m or the application servers 3100 to 3100n, the processor may transmit the commands to the storage devices 3150 to 3150n and 3250 to 3250m or the memories 3120 to 3120n and 3220 to 3220m to program or read the data. For example, the data may be data in which an error is corrected through an Error Correction Code (ECC) engine. The data is data subjected to a data bus inversion (DBI) or a data masking (DM) process, and may include Cyclic Redundancy Code (CRC) information. The data may be data that is encrypted for security and privacy.

The storage devices 3150 to 3150m and 3250 to 3250m may transmit the control signal and command/address signal to the NAND flash memory devices 3252 to 3252m in response to the read command received from the processor. Accordingly, when data is read from the NAND flash memory devices 3252 to 3252m, a Read Enable (RE) signal is input as a data output control signal, and may be used to output the data to the DQ bus. A Data Strobe (DQS) may be generated, using the RE signal. Commands and address signals may be latched to the page buffer, depending on a rising edge or a falling edge of a Write Enable (WE) signal.

The controller 3251 may generally control the operation of the storage device 3250. In an embodiment of the present disclosure, the controller 3251 may include a Static Random Access Memory (SRAM). The controller 3251 may write data in the NAND flash 3252 in response to a write command, or may read the data from the NAND flash 3252 in response to a read command. For example, the write command and/or the read command may be provided from the processor 3210 in the storage server 3200, a processor 3210m in another storage server 3200m or the processors 3110 and 3110n in the application servers 3100 and 3100n. A DRAM 3253 may temporarily store (e.g., buffer) the data to be written in the NAND flash 3252 or the data read from the NAND flash 3252. In addition, the DRAM 3253 may store the metadata. Here, the metadata is a user data or data generated by the controller 3251 to manage the NAND flash 3252. The storage device 3250 may include a Secure Element (SE) for security and privacy.

In concluding the detailed description, those skilled in the art will appreciate that many variations and modifications may be made to the disclosed embodiments. Therefore, the disclosed embodiments are not for purposes of limitation.

What is claimed is:

1. A storage device, comprising:
a nonvolatile memory which includes a first memory block configured to store a first user data; and
a controller configured to perform a patrol read on the first user data by applying a monitoring voltage to memory cells where the first user data is stored,
wherein the controller is configured to increase a reclaim count for the first user data, when the first user data requires a reclaim,
the controller is configured to determine that the first user data is a cold data, based on the reclaim count for the first user data being greater than a threshold value,
the controller is configured to perform a first reclaim on the first user data and generate metadata including the reclaim count for the first user data when the first user data is determined to be the cold data, and the nonvolatile memory is configured to store the first user data in a second memory block different from the first memory block in response to the first reclaim, the controller is configured to determine that the first user data is a non-cold data, based on the reclaim count for the first user data being not greater than the threshold value, the controller is configured to perform a third reclaim different from the first reclaim on the first user data and maintain an existing metadata when the first user data is determined to be the non-cold data, wherein the first user data is determined to require the reclaim based on voltage output from the memory cells where the first user data is stored after the monitoring voltage is applied is different from a reference voltage.

2. The storage device of claim 1, wherein the first memory block includes a single level cell (SLC), and the second memory block includes a multi level cell (MLC), a triple level cell (TLC), or a quad level cell (QLC).

3. The storage device of claim 1, wherein a storage capacity of a first memory cell included in the first memory block is smaller than a storage capacity of a second memory cell included in the second memory block.

4. The storage device of claim 1, wherein the nonvolatile memory includes a third memory block configured to store a second user data, the controller is configured to perform a patrol read on the second user data, and the controller is configured to increase the reclaim count for the second user data, when the second user data requires a reclaim, and the controller is configured to perform a second reclaim on the second user data without determining that the second user data is cold data, based on the reclaim count of the second user data.

5. The storage device of claim 4, wherein the nonvolatile memory is configured to store the second user data in a fourth memory block different from the third memory block in response to the second reclaim, and a storage capacity of a third memory cell included in the third memory block is not smaller than a storage capacity of a fourth memory cell included in the fourth memory block.

6. The storage device of claim 1, wherein the controller is configured to determine that the first user data is the cold data on the basis of the metadata.

7. The storage device of claim 1, wherein the second memory block is configured to store a second user data different from the first user data, and the nonvolatile memory device includes a third memory block different from the first and second memory blocks, the controller is configured to perform a patrol read on the second user data, the controller is configured to increase the reclaim count for the second user data, when the second user data requires a reclaim, the controller is configured to determine that the second user data is cold data, based on the reclaim count for the second user data, the controller is configured to perform the first reclaim on the first user data determined to be the cold data, and the controller is configured to perform a second reclaim on the second user data determined to be the cold data.

8. The storage device of claim 7, wherein the nonvolatile memory is configured to store the first user data in the third memory block in response to the first reclaim, and is configured to store the second user data in the third memory block in response to the second reclaim, and a storage capacity of the first memory cell included in the first memory block and a storage capacity of the second memory cell included in the second memory block are smaller than a storage capacity of a third memory cell included in the third memory block.

9. A storage device, comprising:
a nonvolatile memory; and
a controller configured to receive a first user data, a logical block address and a write command from an external device, configured to generate a first matching table of a first address that matches with the logical block address, and configured to output the first address and the first user data to the nonvolatile memory, wherein the nonvolatile memory is configured to store the first user data on the basis of the first address, the controller is configured to increase a reclaim count for the first user data, is configured to perform a first reclaim on the first user data, and is configured to generate a second matching table on a second address that matches with the logical block address, and the second address is different from the first address, wherein the controller is configured to generate metadata including a reclaim count for the first user data, and the controller is configured to perform the first reclaim after determining that the first user data is a cold data on the basis of the metadata when the reclaim count for the first user data is greater than a threshold value, wherein the controller is configured to perform the first reclaim on the first user data on the basis of the reclaim count, the controller is configured to determine that the first user data is a non-cold data, based on the reclaim count for the first user data being not greater than the threshold value, the controller is configured to perform a second reclaim different from the first reclaim on the first user data and maintain an existing metadata when the first user data is determined to be the non-cold data, and a first memory block in which the first user data is stored on the basis of the first address is different from a second memory block in which the first user data is stored on the basis of the second address, and wherein the first user data is determined to require the first reclaim based on voltage output from memory cells where the first user data is stored after a monitoring voltage is applied is different from a reference voltage.

10. The storage device of claim 9, wherein a storage capacity of a first memory cell included in the first memory block is smaller than a storage capacity of a second memory cell included in the second memory block.

11. The storage device of claim 9, wherein the controller is configured to receive the logical block address and the read command from the external device, and is configured to provide the nonvolatile memory with a second address that matches with the logical block address on the basis of the second matching table, and the nonvolatile memory is configured to output the first user data in response to the second address.

12. A storage device, comprising:
a first nonvolatile memory configured to store a first user data;
a second nonvolatile memory different from the first nonvolatile memory; and a controller configured to perform a patrol read on the first user data by applying a monitoring voltage to memory cells where the first user data is stored, wherein the controller is configured to increase a reclaim count for the first user data, when the first user data requires a first reclaim, the controller is configured to provide the first user data to the second nonvolatile memory, based on the reclaim count for the first user data, and the second nonvolatile memory is configured to store the first user data, wherein the controller is configured to generate metadata including the reclaim count for the first user data, and is configured to determine that the first user data is a cold data on the basis of the metadata when the reclaim count for the first user data is greater than a threshold value, the controller is configured to determine that the first user data is a non-cold data, based on the reclaim count for the first user data being not greater than the threshold value, the controller is configured to perform a second reclaim different from the first reclaim on the first user data and maintain an existing metadata when the first user data is determined to be the non-cold data, wherein the first user data is determined to require the first reclaim based on voltage output from the memory cells where the first user data is stored after the monitoring voltage is applied is different from a reference voltage.

13. The storage device of claim 12, wherein a storage capacity of a first memory cell included in the first nonvolatile memory is smaller than a storage capacity of a second memory cell included in the second nonvolatile memory.

14. The storage device of claim 12, wherein the controller includes a first sub-controller configured to control the first nonvolatile memory, and a second sub-controller configured to control the second nonvolatile memory.

* * * * *